US00RE40434E

(19) United States
(12) Reissued Patent
Dearnley et al.

(10) Patent Number: US RE40,434 E
(45) Date of Reissued Patent: Jul. 15, 2008

(54) HIGH ISOLATION DUAL POLARIZED ANTENNA SYSTEM USING DIPOLE RADIATING ELEMENTS

(75) Inventors: Russell W. Dearnley, Naperville, IL (US); Ronald J. Brandau, Lockport, IL (US); George Xu, Vic (AU)

(73) Assignee: Andrew Corporation, Westchester, IL (US)

(21) Appl. No.: 09/923,943

(22) Filed: Aug. 6, 2001

Related U.S. Patent Documents

Reissue of:
(64) Patent No.: 5,952,983
Issued: Sep. 14, 1999
Appl. No.: 08/856,440
Filed: May 14, 1997

(51) Int. Cl.
*H01Q 21/00* (2006.01)

(52) U.S. Cl. ..... 343/817; 343/797; 343/810
(58) Field of Classification Search ..... 343/793, 343/797, 810, 813, 815, 817, 818, 819
See application file for complete search history.

(56) References Cited

U.S. PATENT DOCUMENTS 4,446,465 A * 5/1984 Donovan ..... 343/797
5,629,713 A 5/1997 Mailandt et al. ..... 343/808
5,952,983 A 9/1999 Dearnley et al. ..... 343/817
6,072,439 A 6/2000 Ippolito et al. ..... 343/797
6,121,935 A * 9/2000 Reece et al. ..... 343/725
6,864,852 B2 * 3/2005 Chiang et al. ..... 343/817

* cited by examiner

*Primary Examiner*—Tan Ho
(74) *Attorney, Agent, or Firm*—Nixon Peabody LLP

(57) ABSTRACT

An antenna for receiving electromagnetic signals comprises: a ground plane with a length and having a vertical axis along the length. A plurality of dipole radiating elements, the radiating elements are comprised of first and second co-located, orthogonal dipoles, the dipoles are aligned at first and second predetermined angles with respect to the vertical axis, the radiating elements and ground plane produce first electromagnetic fields in response to said electromagnetic signals. A plurality of supports, the supports are connected to the ground plane and perpendicular to the vertical axis and placed between selected of the plurality of dipole radiating elements. A plurality of metallic parasitic elements are placed in a selected of said plurality of supports, the first electromagnetic fields exiciting currents in said metallic parasitic elements, the currents creating second electromagnetic fields, the second electromagnetic fields canceling with portions of the first electromagnetic fields.

37 Claims, 8 Drawing Sheets

HIGH ISOLATION DUAL POLARIZED ANTENNA SYSTEM USING DIPOLE RADIATING ELEMENTS

Matter enclosed in heavy brackets [ ] appears in the original patent but forms no part of this reissue specification; matter printed in italics indicates the additions made by reissue.

BACKGROUND OF THE INVENTION

Base stations used in wireless telecommunication systems have the capability to receive linear polarized electromagnetic signals. These signals are then processed by a receiver at the base station and fed into the telephone networks. In practice, the same antenna which receives the signals can also be used to transmit signals if the transmitted signals are at different frequencies than the received signals.

A wireless telecommunication system suffers from the problem of multi-path fading. Diversity reception is often used to overcome the problem of severe multi-path fading. A diversity technique requires at least two signal paths that carry the same information but have uncorrelated multi-path fadings. Several types of diversity reception are used at base stations in the telecommunications industry including space diversity, direction diversity, polarization diversity, frequency diversity, and time diversity. A space diversity system receives signals from different points in space requiring two antennas separated by a significance distance. Polarization diversity uses orthogonal polarization to provide uncorrelated paths.

As is well-known in the art, the sense or direction of polarization of an antenna is measured from a fixed axis and can vary, depending upon system requirements. In particular, the sense of polarization can range from vertical polarization (0 degrees) to horizontal polarization (90 degrees). Currently, the most prevalent types of polarization used in systems are those which use vertical/horizontal and ±45°/−45° polarization ("slant 45°"). However, other angles of polarization can be used. If an antenna receives or transmits signals of two polarizations normally orthogonal, they are also known as dual polarized antennas.

An array of slant 45° polarized radiating elements is constructed using a linear or planar array of cross-dipoles located above a ground plane. A crossed dipole is a pair of dipoles whose centers are co-located and whose axes are orthogonal. The axes of the dipoles are arranged such that they are parallel with the polarization sense required. In other words, the axes of each of the dipole is positioned at some angle with respect to the vertical axis of the antenna array.

One problem associated with such a configuration is the interaction of the electromagnetic field of each crossed dipole with the fields of the other crossed dipoles and the surrounding structures which support and house the crossed dipoles. As is well known in the art, the individual electromagnetic fields surrounding the dipoles transfer energy to each other. This mutual coupling or leakage influences the correlation of the two orthogonally polarized signals; the amount of coupling is often referred to as "isolation." The isolation between orthogonally polarized signals is preferably −30 dB or less.

The visual impact of base station towers on communities has become a societal concern. It has become desirable to reduce the size of these towers and thereby lessen the visual impact of the towers on the community. The size and scale of the towers can be reduced by using base station towers with fewer antennas. This can be achieved if dual polarized antennas and polarization diversity are used. Such systems replace systems using space diversity which require pairs of vertically polarized antennas. Some studies indicate that, for urban environments, polarization diversity provides an equivalent signal quality as space diversity. With the majority of base station sites located in urban environments, it is likely that dual polarized antennas will be used in place of the conventional pairs of vertically polarized antennas.

SUMMARY OF THE INVENTION

It is a principle object of the invention to provide an antenna array comprised of dual polarized radiating elements which are used to receive signals for a polarization diversity receiver.

It is a further object of the invention to provide an antenna array where the radiating elements are comprised of crossed-dipole elements.

It is another object of the invention to provide an antenna array which improves isolation between the sum of one set of like-polarized signals and the sum of the orthogonal set of polarized signals.

It is yet another object of the invention to provide an antenna that minimizes the number of antennas required thereby providing an aesthetically pleasing structure that is of minimum size and scale.

It is still another object of the invention to provide an array of radiating elements where electrical "downtilt" is used.

These and other objects of the invention are provided by an improved antenna system comprising an array of radiating elements, the array having a length and placed on a ground plane and having a vertical axis along its length, the array comprising a plurality of dipole radiators, said radiators comprised of first and second crossed dipoles, said dipoles aligned at a predetermined angle with respect to said vertical axis, said radiating elements producing first electromagnetic fields; a plurality of supports, said supports perpendicular to said vertical axis and placed between selected of said plurality of dipole radiators; a plurality of metallic parasitic elements placed in a selected of said plurality of supports, said first electromagnetic fields exciting currents in said metallic parasitic elements, said currents creating second electromagnetic fields, said second electromagnetic fields canceling with said first electromagnetic fields.

DETAILED DESCRIPTION OF THE PREFERRED EMBODIMENT

Figure 1:
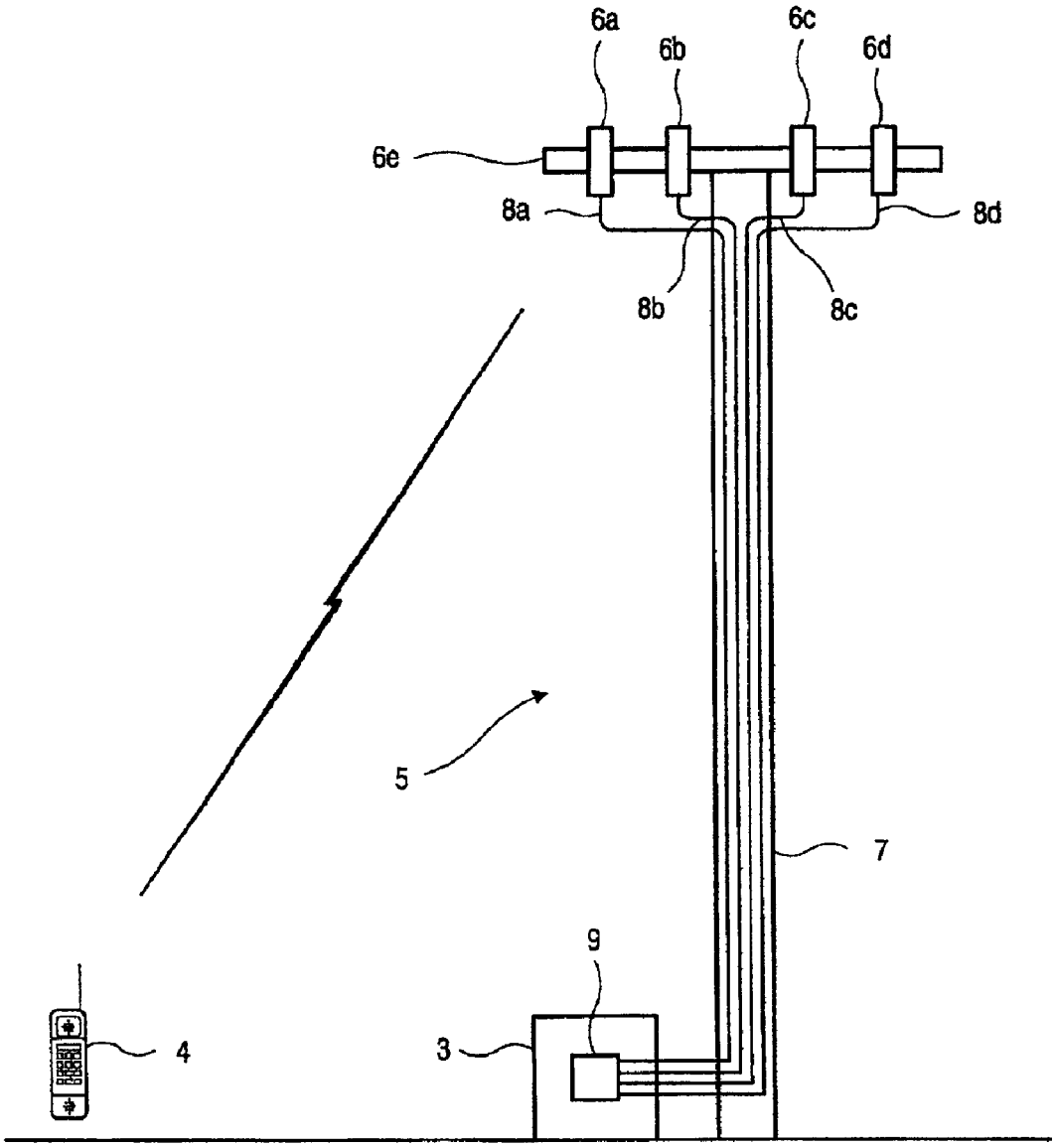
FIG. 1 is a block diagram of the overall system which utilizes antennas according to principles of the present invention.

Referring now to FIG. 1, a user with a cellular phone 4 transmits an electromagnetic signal to a bass station 5. The base station 5 comprises a plurality of antennas 6a, 6b, 6c, and 6d connected to a platform. As discussed below, each antenna comprises a plurality of crossed (co-located, orthogonal) dual dipole radiating elements. Alternatively, the antennas can be connected to a tower 7. The platform 6e is coupled to a tower 7 which elevates the antennas above surrounding buildings and other destructions. The received signals pass over a plurality of transmission lines 8a, 8b, 8c, and 8d to a base station processing system 3 which includes a diversity receiver 9. From the base station processing system 3, the processed signals are transmitted over land phone lines and into the telephone network using equipment and techniques which are well known to those skilled in the art.

Figure 2:
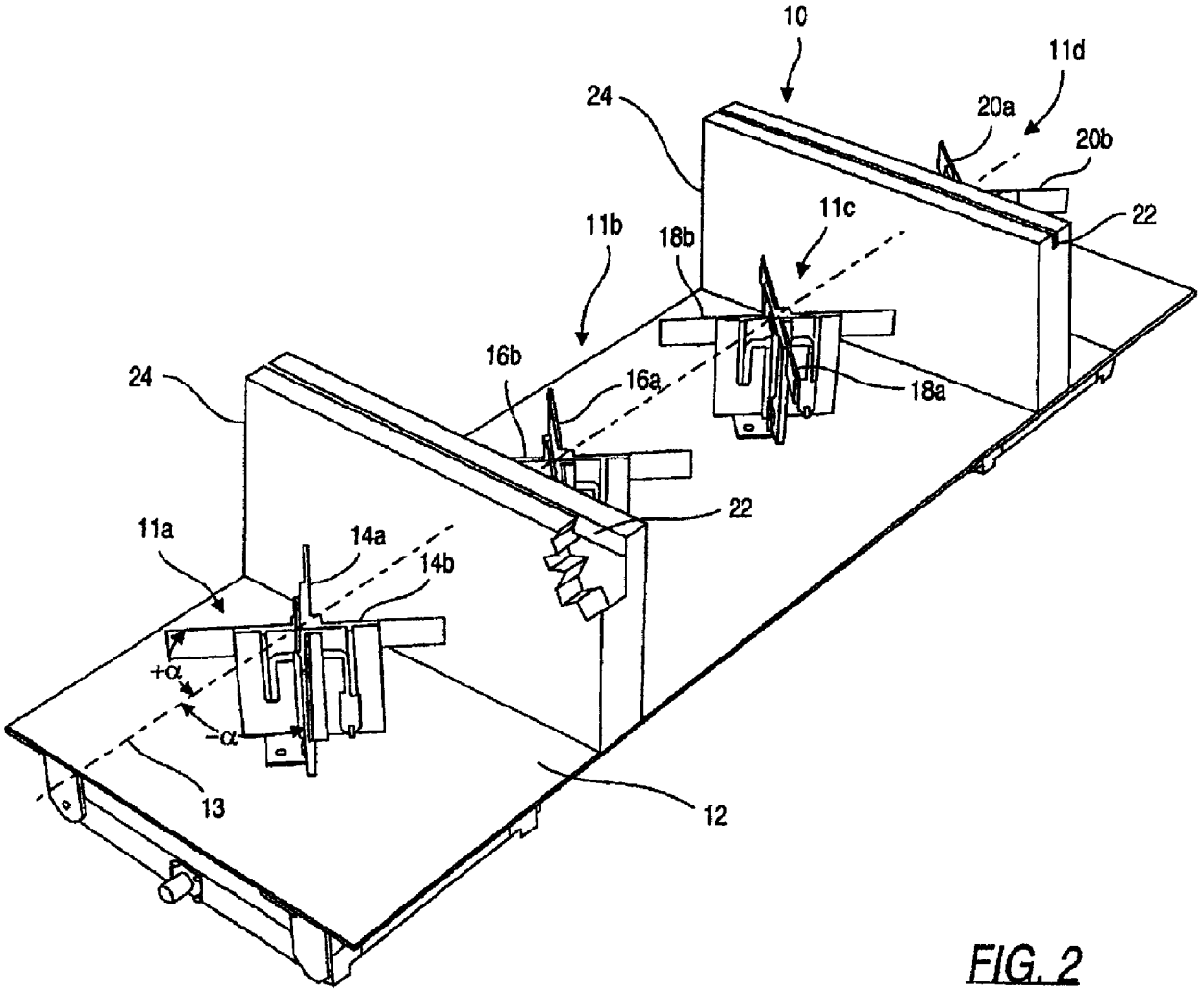
FIG. 2 shows a perspective view of an array of receivers together with the parasitic elements according to principles of the present invention.
Figure 3:
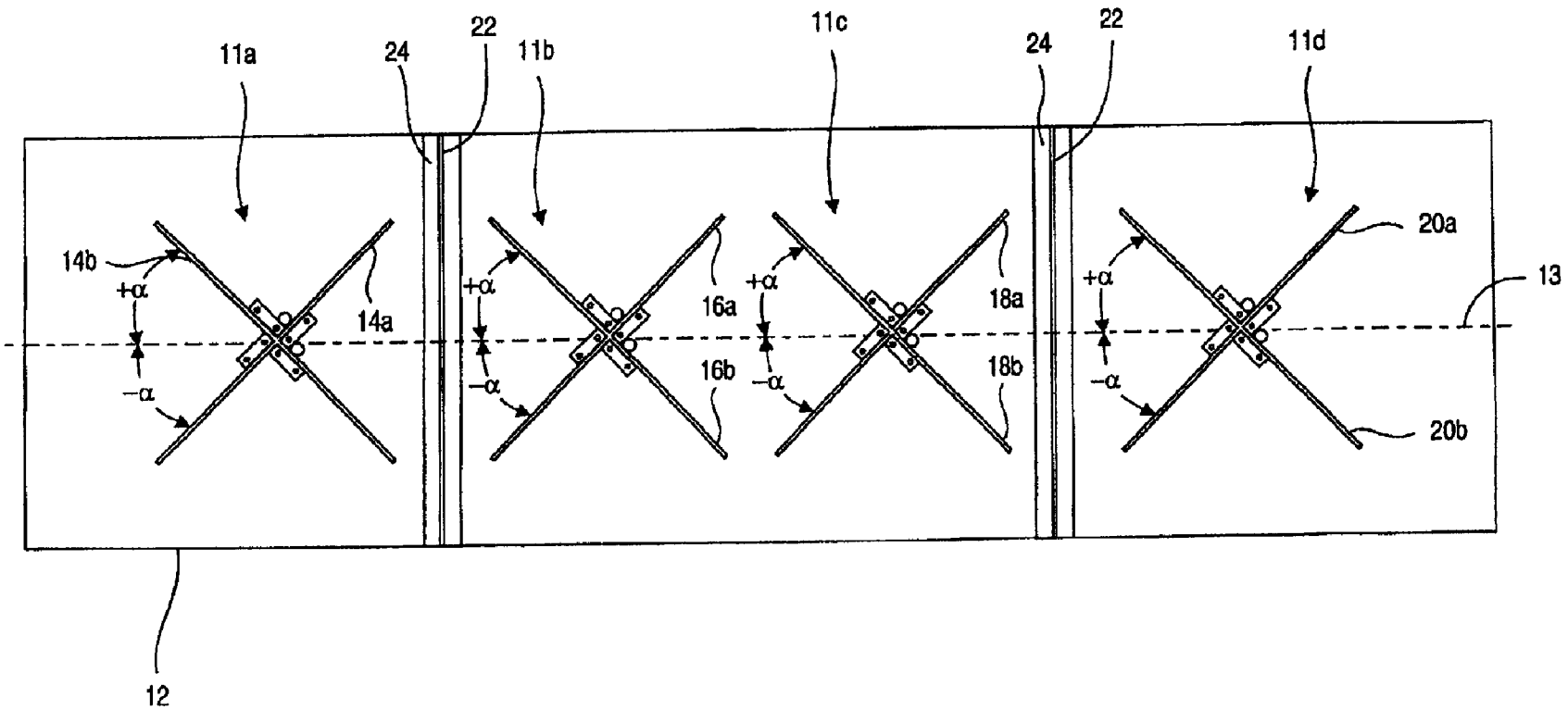
FIG. 3 shows a top view of the array of FIG. 2 according to principles of the present invention.
Figure 4:
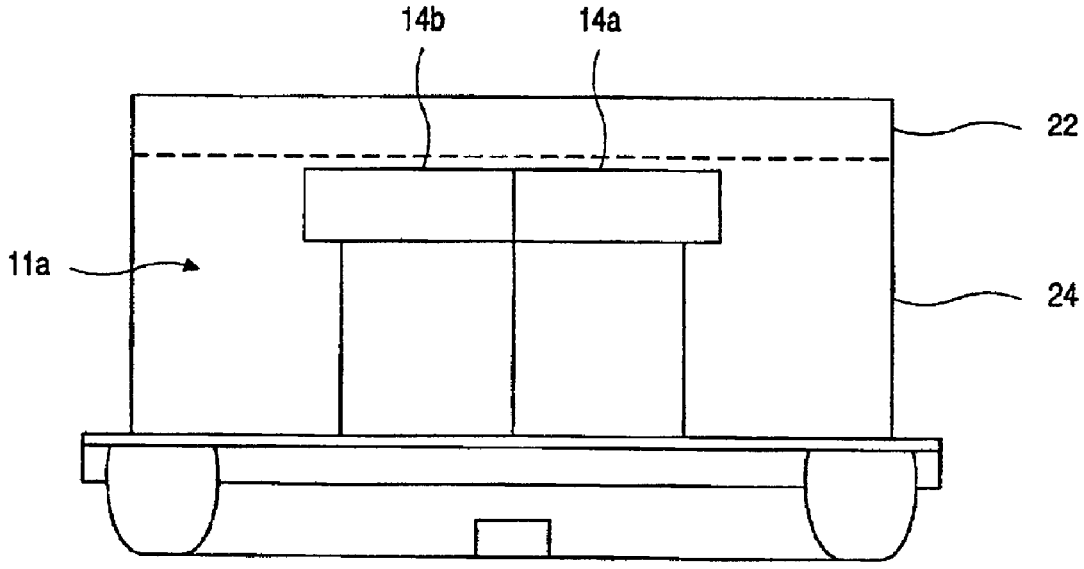
FIG. 4 is an end view of the array of FIG. 2 according to principles of the present invention.

Referring now to FIGS. 2–4, an array (antenna) 10 of crossed, dual-polarized dipole radiating elements 11a, 11b, 11c, and 11d are connected to a ground plane 12. The composition and dimensions of the radiating elements 11a, 11b, 11c, and 11d and the ground plane 12 determine the radiation characteristics, beam width, and the impedance of the radiating elements. Preferably, the radiating elements 11a, 11b, 11c, and 11d and the ground plane 12 are composed of some metal such as aluminum. However, other metals can be used to construct the radiating elements and the ground plane 12 such as copper or brass.

It will be understood by those skilled in the art that the gain of the antennas is proportional to the number of spaced radiating elements present in the array. In other words, increasing the number of radiating elements in the array increase the gain while decreasing the number of radiating elements decreases the antenna's gain. Therefore, although only four radiating elements are shown, the number of radiating elements can be increased to any number to increase the gain. Conversely, the number of radiating elements can be reduced as required thereby reducing the gain.

The radiating elements 11a, 11b, 11c, and 11d transmit and receive electromagnetic signal transmissions and are comprised of pairs of dipoles 14a and 14b, 16a and 16b, 18a and 18b and 20a and 20b, respectively. The dipoles comprising the radiating elements 11a, 11b, 11c, and 11d are crossed and configured with 45 degree slant angles (with respect to the axis of the array 13). That is, the axes of the dipoles are arranged such that they are parallel with the polarization sense required. As shown, the slant angles $+\alpha$ and $-\alpha$ are +45 degrees and −45 degrees, respectively. Although shown with slant angles of +45 degrees and −45 degrees, it will be understood by those skilled in the art that these angles can be varied to optimize the performance of the antenna. Moreover, each angle need not be identical in magnitude. For example, $+\alpha$ and $-\alpha$ can be +30 degrees and −60 degrees, respectively.

Each of the radiating elements 11a, 11b, 11c, and 11d receive signals having polarizations of +45 degrees and −45 degrees. That is, one dipole in the radiating element receives signals having polarization of +45 degrees while the other dipole receives signals with polarizations of −45 degrees. The received signals from parallel dipoles, 14a, 16a, 18a, 20a or 14b, 16b, 18b, and 20b, are combined using a feed network (not shown) for each polarization. The feed network is composed of coaxial, microstrip, stripline, or other transmission line structures. The two combined signals are fed to a diversity receiver which chooses the strongest amongst these two signals for further processing. Each of the radiating elements 11a, 11b, 11c, and 11d can also act as a transmitter provided that the transmitted signal is at a different frequency than the received signal.

A parasitic element 22 is placed on a support 24. In order to be non-conducting, the support is comprised of a polyethylene form. However, other suitable non-conducting materials such as other non-conducting plastics or foams can be substituted for polyethylene foam and used for construction of the support 24. The support 24 is first formed and attached to the back plane 12. A groove is then cut into the support 24 into which the parasitic element 22 is inserted.

In order for currents to be induced, the parasitic element 22 is formed of metal. This metal is preferably aluminum, although other metals such as copper or brass can also be used. A primary electromagnetic wave or field incident upon the array structure induces currents on the surfaces of the crossed dipoles of each of the radiating elements of the array, the parasitic elements, and the surrounding metal structure. These induced currents create a weaker secondary electromagnetic field which will combine with the primary electromagnetic field. A state of equilibrium will occur such that the final electromagnetic field is different from the primary electromagnetic field. The dimensions and positions of the parasitic elements are a factor in determining the final field. In other words, the improved isolation of the present invention is achieved by currents excited on the parasitic elements which re-radiate energy that cancels the energy which couples from one polarization to the other causing the isolation to be at a minimum.

The parasitic elements are placed halfway between the crossed dipole radiating elements of the array and are perpendicular to the axis 13 of the array. However, parasitic elements are not necessarily placed in between every element of the array. A network analyzer is used to determine the optimum number and positioning of the elements. In particular, the network analyzer is employed such that the isolation of any given configuration of radiating elements and parasitic elements can be measured. The length of the parasitic elements controls the magnitude of the current produced. For example, with the length at approximately one-half a wavelength, the maximum amount of current is produced. Thus, the performance of the system can also be optimized by changing the length of some or all of the parasitic elements.

Positioning the parasitic element above the top of the crossed dipoles has been found to optimize isolation for this array configured. However, the height of the placement of the parasitic element can vary depending on the array configuration.

The parasitic elements are situated so as to cause no undue side effects such as degradation of the return loss (VSWR) nor do the parasitic elements unduly disturb the normal array radiation patterns. It has been found that optimum antenna performance occurs when the parasitic elements are placed parallel to or perpendicular to the vertical axis of the array. Placing the parasitic elements at other angles with respect to the vertical axis of the array has been found to detrimentally affect antenna performance. As discussed above, a network analyzer is used to determine when isolation improves and radiation patterns measured confirm to pattern performance.

In an illustrative embodiment of the configuration of FIG. 2, four crossed-dipole antennas were placed on a ground plane 480 mm long by 150 mm wide to operate in the PCS/N band of frequencies which is 1710–1990 MHz. The vertical axis 13 of the array stretched along the 480 mm length. Four dual polarized, crossed-dipole radiating elements were used. The first radiating element was placed 60 mm from the edge, the second element was placed 120 mm from the first element, the third 120 mm from the second element, and the fourth 120 mm from the third element. The elements were aligned along the vertical axis of the array having slant angles of +45 degrees and −45 degrees with respect to the vertical axis 13 of the array.

Two supports were situated 120 mm from the edges of the ground plane and perpendicular to the vertical axis of the array. The supports were 75 mm tall and had a thin, rectangular parasitic element placed on top. The parasitic element was 5 mm wide and 150 mm long. The parasitic elements were placed at the top of the support and extended along the full length of the support.

Figure 5:
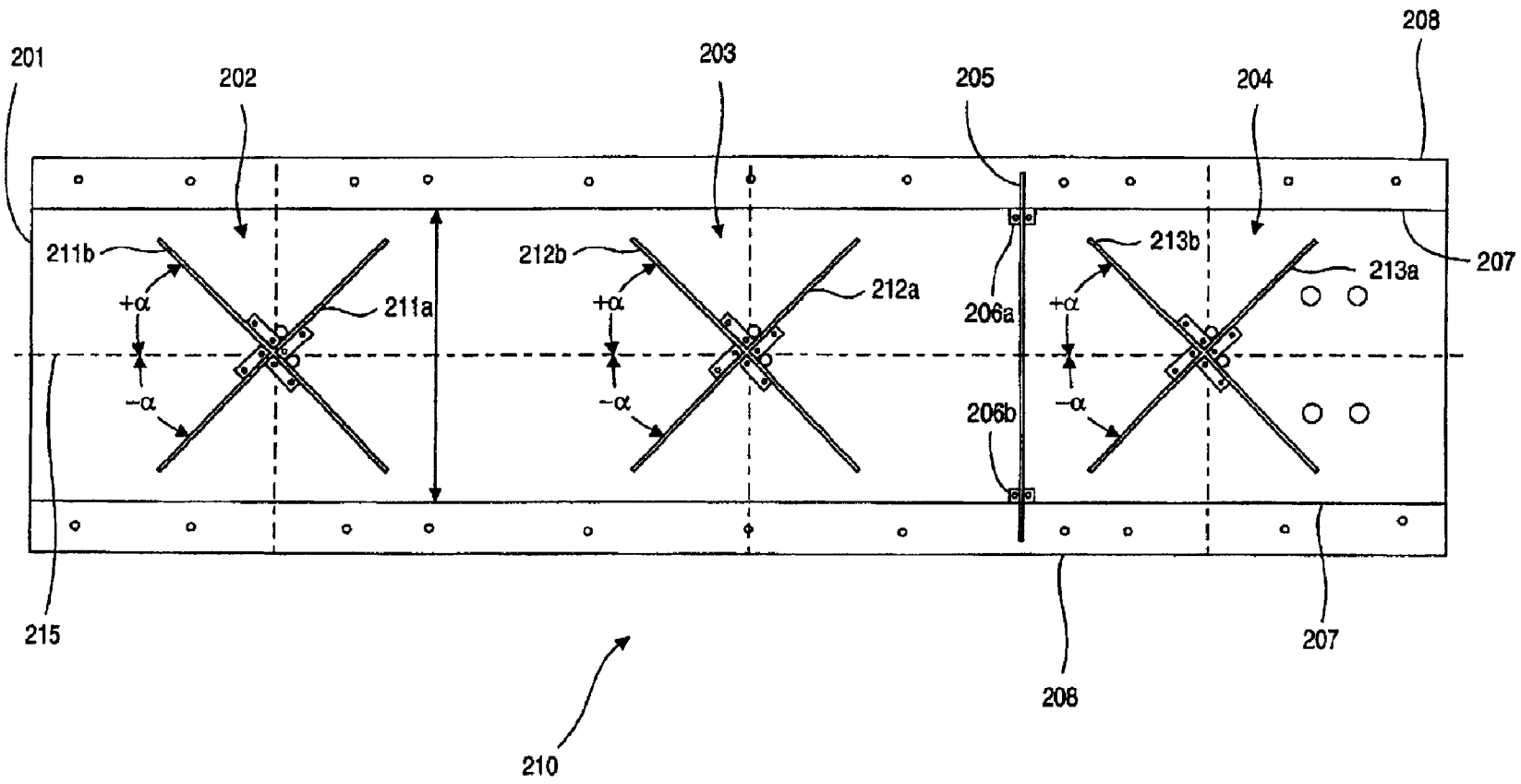
FIG. 5 is a top view showing de-coupling rods used as parasitic elements according to principles of the present invention.
Figure 6:
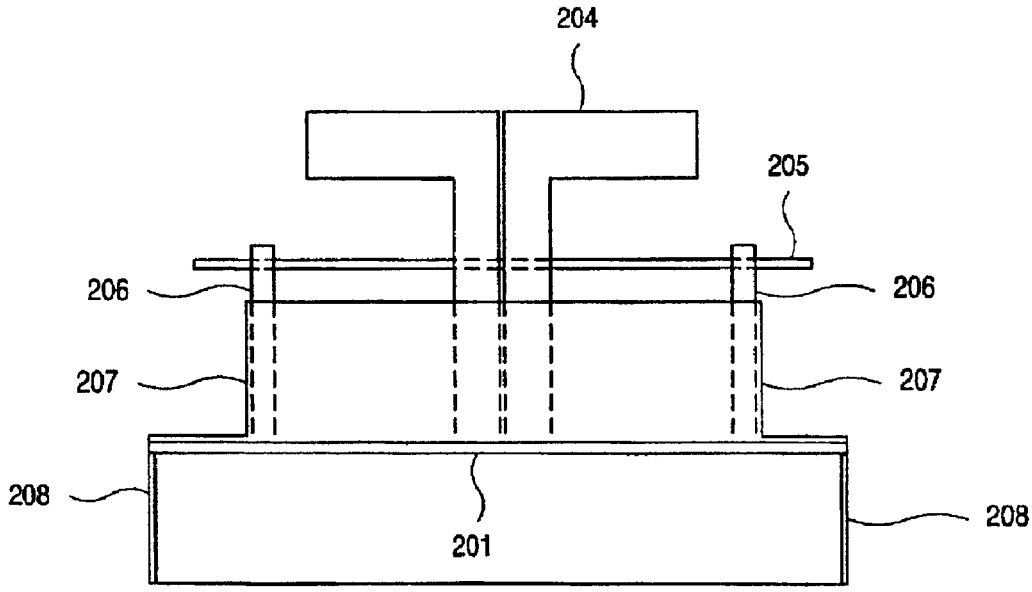
FIG. 6 is an end view showing de-coupling rods used as parasitic elements according to principles of the present invention.

Referring now to FIGS. 5 and 6, an array 210 of crossed, dual-dipole radiating elements 202, 203, and 204 are attached to a ground plane 201 to operate in the cellular band of frequencies of 820–960 MHz. As discussed above, the composition and dimensions of the ground plane 201 and the radiating elements 202, 203, and 204 determine the radiation characteristics, beam width, and the impedance of the antennas.

The radiating elements 202, 203, 204 transmit and receive electromagnetic signal transmissions and are comprised of pairs of dipoles 211a and 211b, 212a and 212b, and 213a and 213b, respectively. The dipoles comprising the radiating elements 202, 203, 204 are crossed and configured with 45 degree slant angles (with respect to the axis of the array 215). That is, the axes of the dipoles are engaged such that they are parallel with the polarization sense required. As shown, the slant angles $+\alpha$ and $-\alpha$ are +45 degrees and −45 degrees, respectively. Although shown with slant angles of +45 degrees and −45 degrees, it will be understood by those skilled in the art that these angles can be varied to optimize the performance of the antenna. A front side wall 207 and rear side wall 208 contribute to the radiation characteristics of the antenna.

Each of the radiating elements 202, 203, and 204 receive signals having polarizations of +45 degrees and −45 degrees. The received signals from parallel dipoles 211a, 212a and 213a, or 211b, 212b, and 213b, are combined using a feed network for each polarization. The feed network is composed of coaxial, microstrip, stripline, or other types of transmission lines. A diversity receiver connected to the antenna then chooses the strongest amongst these two combined signals for further processing. Each of the elements 202, 203, and 204 can also act as a transmitter provided that the transmitted signal is at a different frequency than the received signal.

A parasitic element 205 is supported and elevated by pairs of rod supports 206a and 206b. The parasitic element preferably acts as a de-coupling rod. The parasitic element is perpendicular to the vertical axis 215 of the array. The rod supports are constructed of a non-conducting material. Although one parasitic element is shown, it will be understood that the exact number of parasitic elements can be varied and depend upon the exact configuration and other required characteristics of the antenna.

Figure 7:
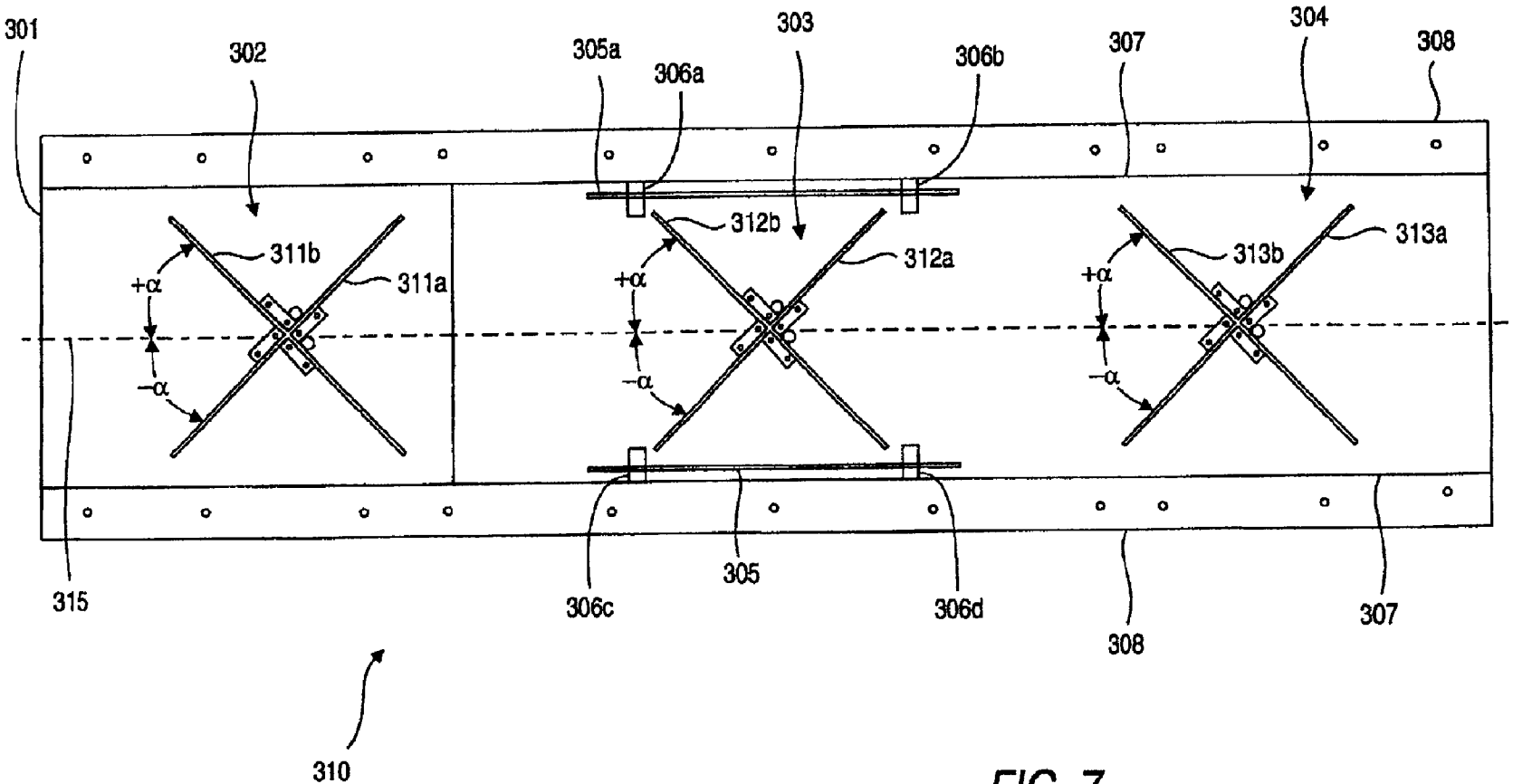
FIG. 7 is a top view showing de-coupling rods used as parasitic elements according to principles of the present invention.
Figure 8:
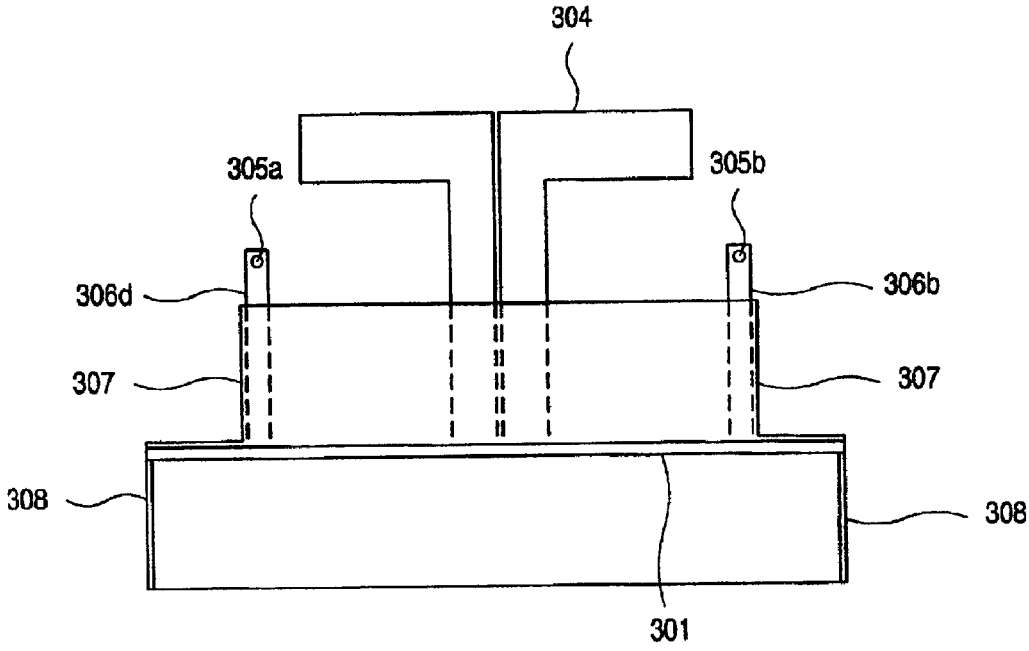
FIG. 8 is an end view showing de-coupling rods used as parasitic elements according to principles of the present invention.

Referring now to FIGS. 7 and 8, an array 310 of crossed, dual-dipole radiating elements 302, 303, and 304 are connected to a ground plane 301 to operate in the cellular band of frequencies of 820–960 MHz. As discussed above, the composition and dimensions of the ground plane 301 and radiating elements 302, 303, and 304 determine the radiation characteristics, beam width, and the impedance of the antennas.

The radiating elements 302, 303, and 304 transmit and receive electromagnetic signal transmissions and are comprised of pairs of dipoles, 311a and 311b, 312a and 312b, and 313a and 313b, respectively. The dipoles comprising the radiating elements 302, 303, and 304 are crossed and configured with 45 degrees slant angles (with respect to the axis of the array 315). That is, the axes of the dipoles are arranged such that they are parallel with the polarization sense required. As shown, the slant angles $+\alpha$ and $-\alpha$ are +45 degrees and −45 degrees, respectively. Although shown with slant angles of +45 degrees and −45 degrees, it will be understood by those skilled in the art that these angles can be varied to optimize the performance of the antenna. A front side wall 307 and rear side wall 308 contribute to the radiation characteristics of the antenna.

Each of the radiating elements 302, 303, and 304 receive signals having polarizations of +45 degrees and −45 degrees. The received signals from parallel dipoles 311a, 312a, and 313a or 311b, 312b, and 313b, are combined using a feed network for each polarization. The feed network is composed of coaxial, microstrip, stripline, or other type of transmission line. A diversity receiver connected to the antenna then chooses the strongest amongst these two combined signals for further processing. Each of the elements 302, 303, and 304 can also act as a transmitter provided that the transmitted signal is at a different frequency than the received signal.

A first parasitic element 305a is supported and elevated by rod supports 306a and 306b. The parasitic element 305a is parallel to the vertical axis 315 of the array. Additionally, a second parasitic element 305b is supported and elevated by rod supports 306c and 306d. The parasitic element 305b is also parallel to the vertical axis 315 of the array and acts as a de-coupling rod. The rod supports are constructed of non-conducting material. Although two parasitic elements are illustrated in this embodiment, it will be understood that the number can be varied according to the exact configuration and operating characteristics of the array.

Thus, an antenna array is provided which is comprised of dual polarized radiating elements and produces two orthogonally positioned signals. Furthermore, the invention provides an antenna array where the antennas are comprised of crossed-dipole elements and which improves isolation between the electromagnetic fields of the crossed dipole elements. An antenna has also been provided which minimizes the number of antennas required in a wireless telecommunication system thereby providing an aesthetically pleasing structure that is of minimum size and scale.

While the present invention has been described with reference to one or more preferred embodiments, those skilled in the art will recognize that many changes may be made thereto without departing from the spirit and scope of the preset invention which is set forth in the following claims.

We claim:

1. An antenna for simultaneously receiving separate electromagnetic signals comprising:

a ground plane with a length and having a vertical axis along said length;

a plurality of dipole radiating elements, said radiating elements comprised of first and second co-located, orthogonal dipoles, said dipoles aligned at first and second predetermined angles with respect to said vertical axis, said radiating elements and ground plane producing first electromagnetic fields in response to said electromagnetic signals;

a plurality of non-conductive supports, said supports connected to said ground plane and perpendicular to said vertical axis and placed between selected of said plurality of dipole radiating elements;

a plurality of independent metallic parasitic elements unconnected to said dipoles and placed in a selected of said plurality of supports, said first electromagnetic fields exciting currents in said metallic parasitic elements, said currents creating second electromagnetic fields, said second electromagnetic fields canceling with portions of said first electromagnetic fields.

2. The antenna of claim 1, whereby said first predetermined angle is substantially equal to +45 degrees with respect to said vertical axis and said second predetermined angle is substantially equal to −45 degrees with respect to said vertical axis.

3. The antenna of claim 1 wherein said parasitic elements are composed of aluminum.

4. The antenna of claim 1 wherein said support comprises an upper surface and said parasitic elements are positioned along said upper surface of said support.

5. The antenna of claim 1 wherein said plurality of supports is located midway between said radiating elements.

6. The antenna of claim 1 wherein said ground plane is composed of metal.

7. The antenna of claim 1 wherein said plurality of radiating elements includes exactly four radiating elements.

8. The antenna of claim 7 wherein said plurality of supports includes exactly two supports.

9. The antenna of claim 1 wherein said radiating elements transmit electromagnetic signals.

10. An antenna for simultaneously receiving separate electromagnetic signals comprising:

a ground plane with a length, said ground plane having a vertical axis along said length;

a plurality of radiating elements, said radiating elements comprised of first and second co-located, orthogonal dipoles, said first dipoles aligned at substantially a +45 degree angle with respect to said vertical axis, said second dipoles aligned at substantially a −45 degree angle with respect to said vertical axis, said radiating elements and ground plane producing a first electromagnetic field;

a plurality of non-conductive supports connected to said ground plane, said supports perpendicular to said vertical axis and placed between selected of said plurality of dipole radiating elements;

a plurality of independent metallic parasitic elements unconnected to said dipoles and placed in a selected of said plurality of supports, said first electromagnetic fields exciting currents in said metallic parasitic elements, said currents creating second electromagnetic fields, said second electromagnetic fields canceling with portions of said first electromagnetic fields; and diversity reception means coupled to said plurality of radiating elements for selecting between said plurality of electrical signals.

11. The antenna of claim 10 wherein said parasitic elements are composed of aluminum.

12. The antenna of claim 10 wherein said parasitic elements are positioned along an upper surface of said supports.

13. The antenna of claim 10 wherein said plurality of supports is located midway between said antennas.

14. The antenna of claim 10 wherein said ground plane is composed of metal.

15. The antenna of claim 10 wherein said plurality of radiating elements includes exactly four radiating elements.

16. A method for providing high isolation for an array of radiating elements comprising the steps of:

simultaneously receiving separate electromagnetic signals;

providing a ground plane having a vertical axis;

providing a plurality of dipole radiating elements, said radiating elements composed of first and second co-located, orthogonal dipoles, said dipoles aligned at a predetermined angle with respect to said vertical axis, said radiating elements having a top surface;

producing first electromagnetic fields in said radiating elements responsive to said electromagnetic signals;

providing a plurality of non-conductive supports, and placing said supports perpendicular to said vertical axis and between selected of said plurality of dipole radiating elements;

providing a plurality of independent metallic parasitic elements unconnected to said dipoles and placed in a selected of said plurality of supports;

exciting currents in said metallic parasitic elements;

creating second electromagnetic fields radiating from said parasitic elements; and canceling with portions of said first electromagnetic fields with said second electromagnetic fields.

17. The method of claim 16 comprising the further step of placing said parasitic elements midway between the top surfaces of said radiating elements and said ground plane.

18. The method of claim 16 comprising the further step of orienting the radiating elements at a predetermined angle with respect to the vertical axis of the array.

19. An antenna for simultaneously receiving separate electromagnetic signals comprising:

a ground plane with a length and having a vertical axis along said length;

a plurality of dipole radiating elements, said radiating elements comprised of first and second co-located, orthogonal dipoles, said dipoles aligned at first and second predetermined angles with respect to said vertical axis, said radiating elements producing first electromagnetic fields in response to said electromagnetic signals;

a plurality of non-conductive supports, said supports connected to said ground plane and parallel to said vertical axis and placed adjacent selected of said plurality of dipole radiating elements;

a plurality of independent metallic parasitic elements unconnected to said dipoles and placed in a selected of said plurality of supports, said first electromagnetic fields exciting currents in said metallic parasitic elements, said currents creating second electromagnetic fields, said second electromagnetic fields canceling with portions of said first electromagnetic fields.

20. The antenna of claim 19 whereby said first predetermined angle is substantially equal to +45 degrees with respect to said vertical axis and said second predetermined angle is substantially equal to −45 degrees with respect to said vertical axis.

21. The antenna of claim 19 wherein said parasitic elements are composed of aluminum.

22. The antenna of claim 19 wherein said supports comprises an upper surface and said parasitic elements are positioned along an upper surface of said support.

23. The antenna of claim 19 wherein said plurality of supports is located adjacent to said radiating elements.

24. The antenna of claim 19 wherein said plane is composed of metal.

25. The antenna of claim 19 wherein said plurality of radiating elements includes exactly three radiating elements.

26. The antenna of claim 25 wherein said plurality of supports includes exactly two sets of supports.

27. A method for providing high isolation for an array of radiating elements comprising the steps of:

simultaneously receiving separate electromagnetic signals;

providing a ground plane having a vertical axis;

providing a plurality of dipole radiating elements, said radiating elements comprised of first and second co-located, orthogonal dipoles, said dipoles aligned at a predetermined angle with respect to said vertical axis, said radiating elements having a top surface;

producing first electromagnetic fields in said radiating elements responsive to said electromagnetic signals;

providing a plurality of non-conductive supports, and placing said supports parallel to said vertical axis and adjacent selected of said plurality of dipole radiating elements;

providing a plurality of independent metallic parasitic elements unconnected to said dipoles and placed in a selected of said plurality of supports;

exciting currents in said metallic parasitic elements;

creating second electromagnetic fields radiating from said parasitic elements; and canceling with portions of said first electromagnetic fields with said second electromagnetic fields.

28. The method of claim 27 comprising the further step of placing said parasitic elements midway between the top surface of said radiating element and ground plane of selected of said housings.

29. The method of claim 27 comprising the further step of orienting the radiating elements at a predetermined angle with respect to the vertical axis of the array.

*30. An antenna comprising:*

*a ground plane;*

*a plurality of antenna components, each component comprising orthogonal, linearly polarized radiating structures electromagnetically coupled to said ground plane and producing electromagnetic fields upon receipt of electromagnetic signals, the individual electromagnetic fields of said antenna components undesirably interacting with each other to impair the overall performance of the antenna;*

*at least one independent, electrically conductive parasitic element electrically unconnected to any of said antenna components, said electromagnetic fields produced by said antenna components inducing currents in said parasitic element; and*

*said at least one parasitic element being constructed, and being arranged relative to said antenna components, such that said currents induced in said at least one parasitic element by said electromagnetic fields reduce said undesirable interaction between said electromagnetic fields of said antenna components.*

*31. The antenna of claim 30 wherein said radiating elements comprise first and second co-located, orthogonal dipoles, said dipoles aligned at first and second predetermined angles with respect to a vertical axis defined by said ground plane.*

*32. The antenna of claim 31 wherein said first predetermined angle is substantially equal to +45 degrees with respect to said vertical axis and said second predetermined angle is substantially equal to −45 degrees with respect to said vertical axis.*

*33. The antenna of claim 31 and further including at least one non-conductive support, said support connected to said ground plane and perpendicular to said vertical axis and placed between selected ones of said plurality of dipole radiating elements for supporting said at least one parasitic element.*

*34. A method of providing an antenna having improved isolation, said method comprising:*

*providing a ground plane;*

*providing a plurality of antenna components, each component comprising orthogonal, linearly polarized radiating structures electromagnetically coupled to said ground plane and producing electromagnetic fields upon receipt of electromagnetic signals, the individual electromagnetic fields of said antenna components undesirably interacting with each other to impair the overall performance of the antenna;*

*providing at least one independent, electrically conductive parasitic element electrically unconnected to any of said antenna components, said electromagnetic fields produced by said antenna components inducing currents in said parasitic element; and*

*said at least one parasitic element being constructed, and being arranged relative to said antenna components, such that said currents induced in said at least one parasitic element by said electromagnetic fields reduce said undesirable interaction between said electromagnetic fields of said antenna components.*

*35. The method of claim 34 wherein providing said radiating elements comprise first and second co-located, orthogonal dipoles, said dipoles aligned at first and second predetermined angles with respect to a vertical axis defined by said ground plane.*

*36. The method of claim 35 wherein said first predetermined angle is substantially equal to +45 degrees with respect to said vertical axis and said second predetermined angle is substantially equal to −45 degrees with respect to said vertical axis.*

*37. The method of claim 35 and further including providing at least one non-conductive support, said at least one support connected to said ground plane and perpendicular to said vertical axis and placed between selected ones of said plurality of dipole radiating elements for supporting said at least one parasitic element.*

* * * * *